United States Patent
Fujisawa

Patent Number: 5,410,224
Date of Patent: Apr. 25, 1995

[54] TAPE POSITION-DEPENDENT, STANDSTILL TAPE TENSION CONTROL SYSTEM

[75] Inventor: Shinobu Fujisawa, Akishima, Japan

[73] Assignee: TEAC Corporation, Tokyo, Japan

[21] Appl. No.: 172,574

[22] Filed: Dec. 22, 1993

[30] Foreign Application Priority Data

Dec. 30, 1992 [JP] Japan ................................. 4-360632

[51] Int. Cl.[6] ........................................... B65H 77/00
[52] U.S. Cl. ........................................... 318/6; 318/7
[58] Field of Search ................... 318/6, 7; 242/67.1 R, 242/67.5, 75, 75.5, 75.51

[56] References Cited

U.S. PATENT DOCUMENTS

| | | |
|---|---|---|
| 4,015,799 | 4/1977 | Koski et al. |
| 4,072,883 | 2/1978 | Beiter |
| 4,163,532 | 8/1979 | Sakai ................................. 242/186 |
| 4,448,368 | 5/1984 | Skalko |
| 4,522,351 | 6/1985 | Yessian et al. |
| 4,788,558 | 11/1988 | Caldwell et al. |

*Primary Examiner*—Bentsu Ro
*Attorney, Agent, or Firm*—Woodcock Washburn Kurtz Mackiewicz & Norris

[57] ABSTRACT

A magnetic tape transport having a pair of reel motors for bidirectionally driving a tape between a pair of reels within a cassette housing, and a pair of tension control transistors for controllably varying supply voltages across the respective reel motors. For holding the tape under tension when it is at rest, against the possibility of tape displacement regardless of varying tape roll diameters on both reels, the output pulses of a tape speed sensor are directed through a bidirectional counter into a digital to analog converter, so that the latter provides a voltage output that varies linearly in magnitude as the tape travels from one extremity toward the other. This variable voltage output from the converter is applied through a tension control circuit to the pair of tension control transistors whenever the tape is stopped. Standstill tape tension is thus controlled by varying the voltages impressed to both reel motors according to the current ratio of tape roll diameters on both reels.

8 Claims, 5 Drawing Sheets

TAPE POSITION-DEPENDENT, STANDSTILL TAPE TENSION CONTROL SYSTEM

BACKGROUND OF THE INVENTION

This invention relates to magnetic tape transports, sometimes referred to as tape units, tape drives, tape decks, etc., for use with a replaceable tape assembly such as that known as a tape cassette or cartridge, and more particularly to digital magnetic tape transports used as a subsystem to enable a host system to obtain access to data on the magnetic tape. Still more particularly, the invention pertains, in such tape transports, to a system for controlling the tension of the tape, especially when it is at a standstill.

Cassette tape transports, particularly to those operating in streaming mode, as contrasted with start/stop mode, have come to find extensive use as peripherals of computer systems. U.S. Pat. No. 4,163,532, filed by Sakai and assigned to the assignee of the instant application, discloses one such streaming cassette tape transport, or streamer. This prior art streamer comprises a pair of reel motors, to be drivingly coupled one to each reel of a tape cassette, for bidirectionally transporting the tape between the two reels under the direction of a motor control circuit forming a part of a tape speed control servo. Also included in the tape speed control servo is a tape speed sensor comprising a roll for frictional engagement with the tape, and an encoder for generating a series of pulses representative of the actual tape speed. The motor control circuit causes one of the reel motors to be driven in response to the tape speed sensor output pulses for constant speed tape transportation in each direction.

The tape must of course travel under proper, constant tension between the reels in order to enable the transducer to correctly write or read data on the tape. To this end the motor control circuit additionally comprises tension control means which afford constant tape tension in the face of varying diameters of tape rolls on both reels. The tape must be held under tension when it is not only traveling but also at rest, in order to prevent the tape from slackening due to external forces.

Conventionally, the pair of reel motors were both energized in opposite directions for holding the tape under tension when it is at rest. The sum of the magnitudes of currents flowing through both reel motors during such times was kept the same regardless of variable tape diameters on both reels, so that a current of greater magnitude flowed through whichever of the reel motors associated with the reel carrying a greater amount of tape. This conventional scheme was effective in the sense that tape tension could be controlled according to tape roll diameters on both reels, though to a limited degree.

When too much difference existed between the tape roll diameters, as in tape positions near the beginning and end of the tape, the prior art system was not necessarily capable of causing the reel motors to be energized accordingly. The tape tended to travel slowly in the worst case because of imbalance in the magnitudes of currents flowing through both reel motors, especially when the tape was exceptionally light weight.

SUMMARY OF THE INVENTION

The present invention aims, in tape transports of the kind defined, at holding the tape under proper tension when it is at a standstill, against the risk of tape displacement no matter what the ratio of tape roll diameters on both reels may be.

Briefly, the invention may be summarized as a tape tension control system for a tape transport for use with a tape assembly, comprising a pair of reel motors, a pair of tension control elements connected one between each reel motor and power supply means, each tension control element being capable of controllably varying a voltage applied from the power supply means to one of the reel motors in response to a variable voltage signal, and tape position sensor means for ascertaining a current position of the tape with respect to a transducer. Also included are tension control means connected between the tape position sensor means and the pair of tension control elements for applying to the tension control elements the variable voltage signals having magnitudes determined by the tape position when the tape is stopped, the variable voltage signals being such that the voltage applied to one of the reel motors decreases linearly, and the voltage applied to the other of the reel motors increases linearly, as the tape travels from a first toward a second extremity thereof, and vice versa.

Typically, the tape position sensor means comprise a familiar tape speed sensor which provides a tape speed pulses indicative of the traveling speed of the tape, and a counter which bidirectionally counts the tape speed pulses from either extremity of the tape toward the other, so that wherever the tape is stopped, the count of the bidirectional counter represents the current position of the tape. The counter count is subsequently translated into an equivalent voltage by a digital to analog converter, so that the voltage output of the converter linearly varies with a predetermined gradient from one extremity of the tape toward the other.

Connected next to the digital to analog converter is a tension control circuit comprising first circuit means for applying, when the tape is stopped, to one of the first tension control elements a variable voltage signal having a gradient equal in direction to the gradient of the voltage output of the converter, and second circuit means for applying, also when the tape is stopped, to the other tension control element a variable voltage signals having a gradient opposite in direction to the gradient of the voltage output of the converter.

Thus, whenever the tape is stopped, standstill tape tension is controlled by varying the voltages impressed to both reel motors according to the current position of the tape and hence to the current ratio of tape roll diameters on both reels. There is therefore no danger of the tape accidentally loosening or traveling when it should be at a standstill.

The above and other features and advantages of this invention and the manner of realizing them will become more apparent, and the invention itself will best be understood, from a study of the following description and appended claims, with reference had to the attached drawings showing a preferable embodiment of the invention.

DESCRIPTION OF THE PREFERRED EMBODIMENT

Figure 1:
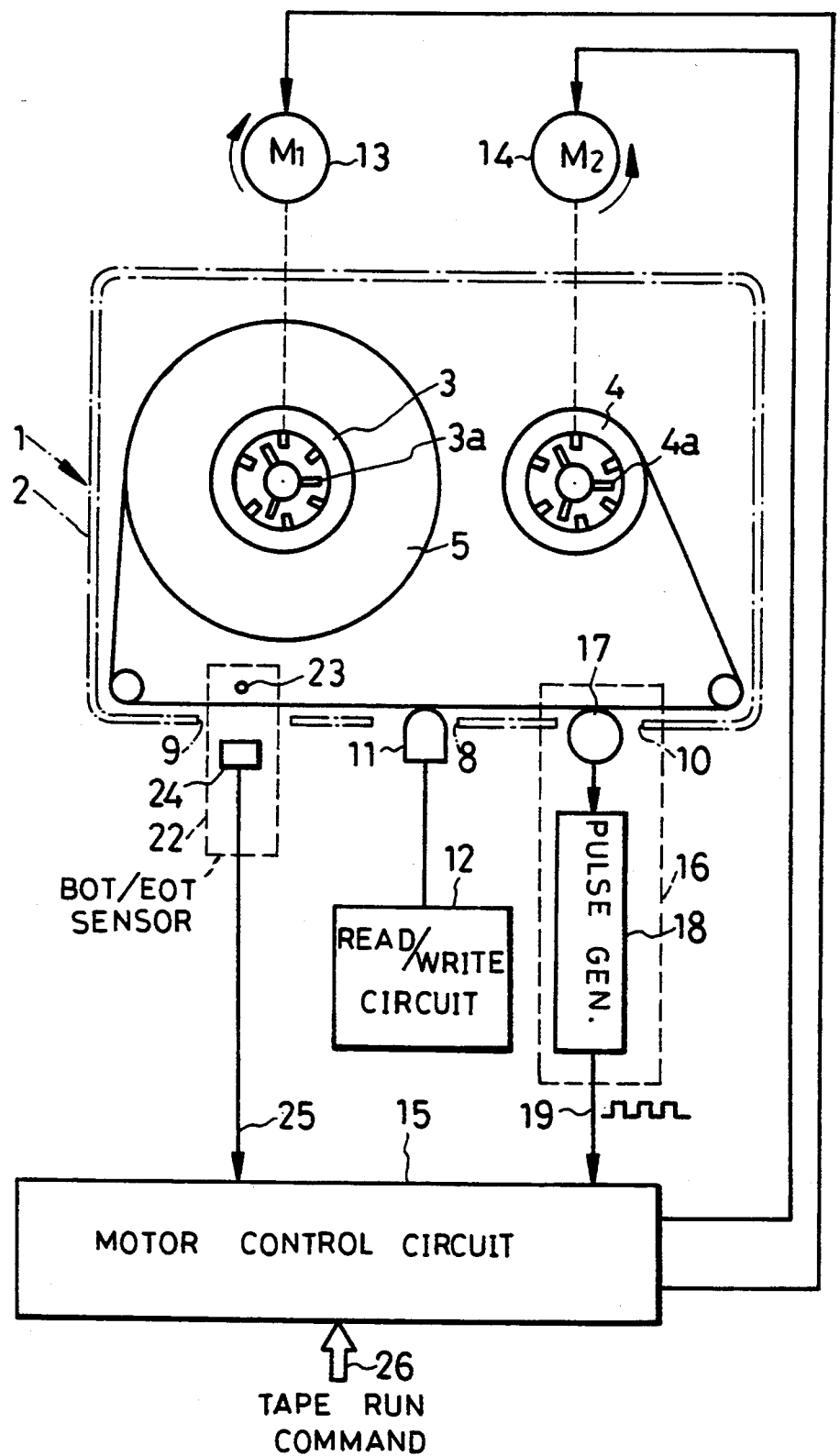
FIG. 1 is a block diagram of a tape transport suitable for use in the practice of the invention, the tape transport being shown together with a pictorial representation of a tape cassette.

The present invention may be best embodied in the streaming tape transport of FIG. 1 which presupposes the use of the so-called digital cassette based on the standard audio cassette developed by Philips. Generally designated 1, the tape cassette has a housing 2 of relatively flat boxlike shape within which there are mounted a file reel 3 and a takeup reel 4 for rotation about spaced parallel axes. A length of magnetic tape 5, shown wound on the file reel 3, extends between the two reels along a predefined guide path. The cassette housing 2 has three windows 8, 9 and 10 formed in one edgewall thereof to expose parts of the tape 5 along the guide path.

The tape transport has a magnetic transducer or read/write head 11 which partly intrudes into the cassette housing 2 through the window 8 for data transfer with the tape 5. A read/write circuit 12 of any known or suitable design is coupled to the head 11 for reading and writing data on the tape.

For bidirectionally running the tape 5 between the reels 3 and 4, there are provided a pair of reel motors 13 and 14 which preferably are controllable speed, direct current motors. The reel motors 13 and 14 have drive spindles 3a and 4a which make driving engagement with the hubs of the reels 3 and 4, respectively, when the tape cassette 1 is loaded in position within the tape transport. The polarities of the reel motors 13 and 14 are so determined as to rotate in a direction for winding up the tape 5; that is, the file reel motor 13 rotates in a clockwise direction, as viewed in FIG. 1, and the takeup reel motor 14 in a counterclockwise direction.

The reel motors 13 and 14 are controllably driven by a motor control circuit 15 through a closed loop servomechanism. The tape speed a control servo includes a tape speed sensor 16. As disclosed in Sakai U.S. Pat. No. 4,163,532, supra, the tape speed sensor 16 comprises a roll 17 and a pulse generator or encoder 18. The speed sensor roll 17 makes frictional contact with the tape 5 through the window 10 in the cassette housing 2. As this roll rotates with the travel of the tape 5, the encoder 18 photoelectrically generates a series of discrete tape speed pulses at a recurrence rate proportional with the tape speed. The tape speed pulses are sent over a line 19 to the motor control circuit 15.

Additionally, a beginning-of-tape (BOT) and end-of-tape (EOT) sensor 22 is connected to the motor control circuit 15. The BOT/EOT sensor 22 detects the standard BOT and EOT markers, not shown, of the tape 5. Typically, such markers are transparent end zones of the otherwise opaque tape 5. For sensing such transparent end zones, the sensor 22 is shown to comprise a light source 23 and a photodetector 24 disposed opposite each other across the tape 5. The noted window 9 in the cassette housing 2 is utilized toward this end. The BOT/EOT sensor 22 sends its output to the motor control circuit 15 over a line 25.

The motor control circuit 15 is itself under the control of a host system, not shown, to which the illustrated tape transport is to be connected as a data storage subsystem. The host system supplies various tape transportation commands to the motor control circuit 15 over a bus 26. Normally, such commands include a tape run command, forward run command, reverse run command, fast run command, and stop command.

Figure 2:
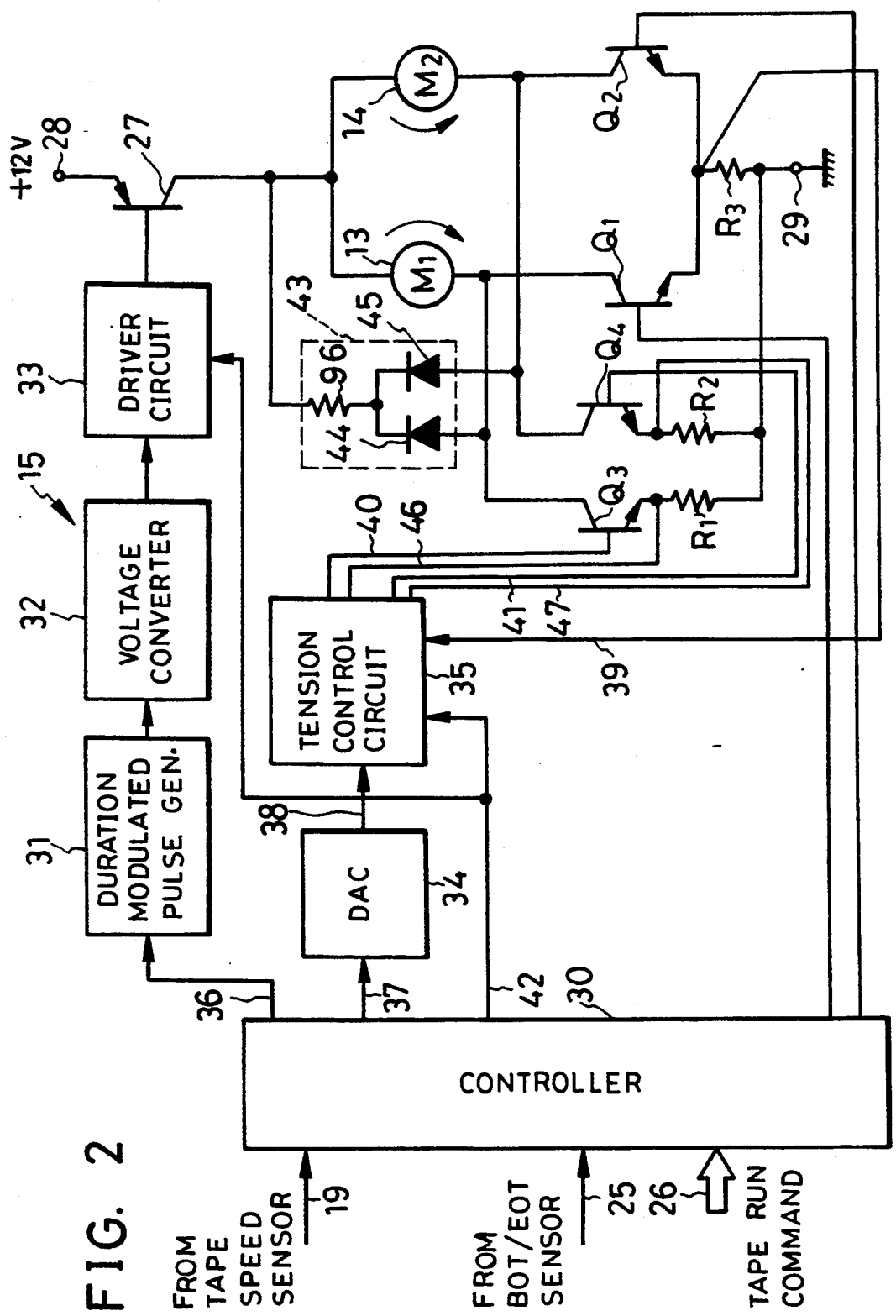
FIG. 2 is a block diagram showing in detail the motor control circuit of the FIG. 1 tape transport.

FIG. 2 is a detailed illustration of the motor control circuit 15 shown together with the reel motors 13 and 14. These reel motors are both connected to a common 12-volt supply terminal 28 on one hand and, on the other hand, to a common grounding terminal 29 via a feedback resistor $R_3$. A speed control transistor 27 is shown connected between the reel motors 13 and 14 and the supply terminal 28 for controlling the magnitude of the supply voltage across both reel motors and hence the traveling speed of the tape 5, although two such transistors could be connected in series with the respective motors for the same purpose.

Two switching transistors $Q_1$ and $Q_2$, hereinafter referred to as the direction control transistors, are connected between the respective reel motors 13 and 14 and the grounding terminal 29. Also, the serial circuits of two tape tension control transistors $Q_3$ and $Q_4$ and two resistors $R_1$ and $R_2$ are connected between the respective reel motors 13 and 14 and the grounding terminal 29. Alternatively, however, the two tension control transistors $Q_3$ and $Q_4$ could be replaced by a single transistors connected to both reel motors via diode switches, as in the aforementioned Sakai patent.

The motor control circuit 15 includes a controller 30, which may take the form of a programmable microprocessor in practice, for controlling the speed control transistor 27, direction control transistors $Q_1$ and $Q_2$, and tension control transistors $Q_3$ and $Q_4$, either directly or indirectly. The controller 30 directly controls the direction control transistors $Q_1$ and $Q_2$, turning the file reel motor switching transistor $Q_1$ off, and the takeup reel motor switching transistor $Q_2$ on, for forward tape travel from file reel 3 to takeup reel 4, and the file reel motor switching transistor $Q_1$ on, and the takeup reel motor switching transistor $Q_2$ off, for reverse tape travel. Both transistors $Q_1$ and $Q_2$ are turned off for stopping the tape.

The controller 30 also takes part in the speed control and tension control of the tape 5. First, for tape speed control, the controller 30 is connected to the base of the speed control transistor 27 via a serial circuit of a duration modulated pulse generator 31, a voltage converter 32 and a transistor driver circuit 33. For tape tension control, on the other hand, the controller 30 is connected to the bases of both tension control transistors $Q_3$ and $Q_4$ via a serial circuit of a digital to analog converter (DAC) 34 and a tension control circuit 35.

Figure 3:
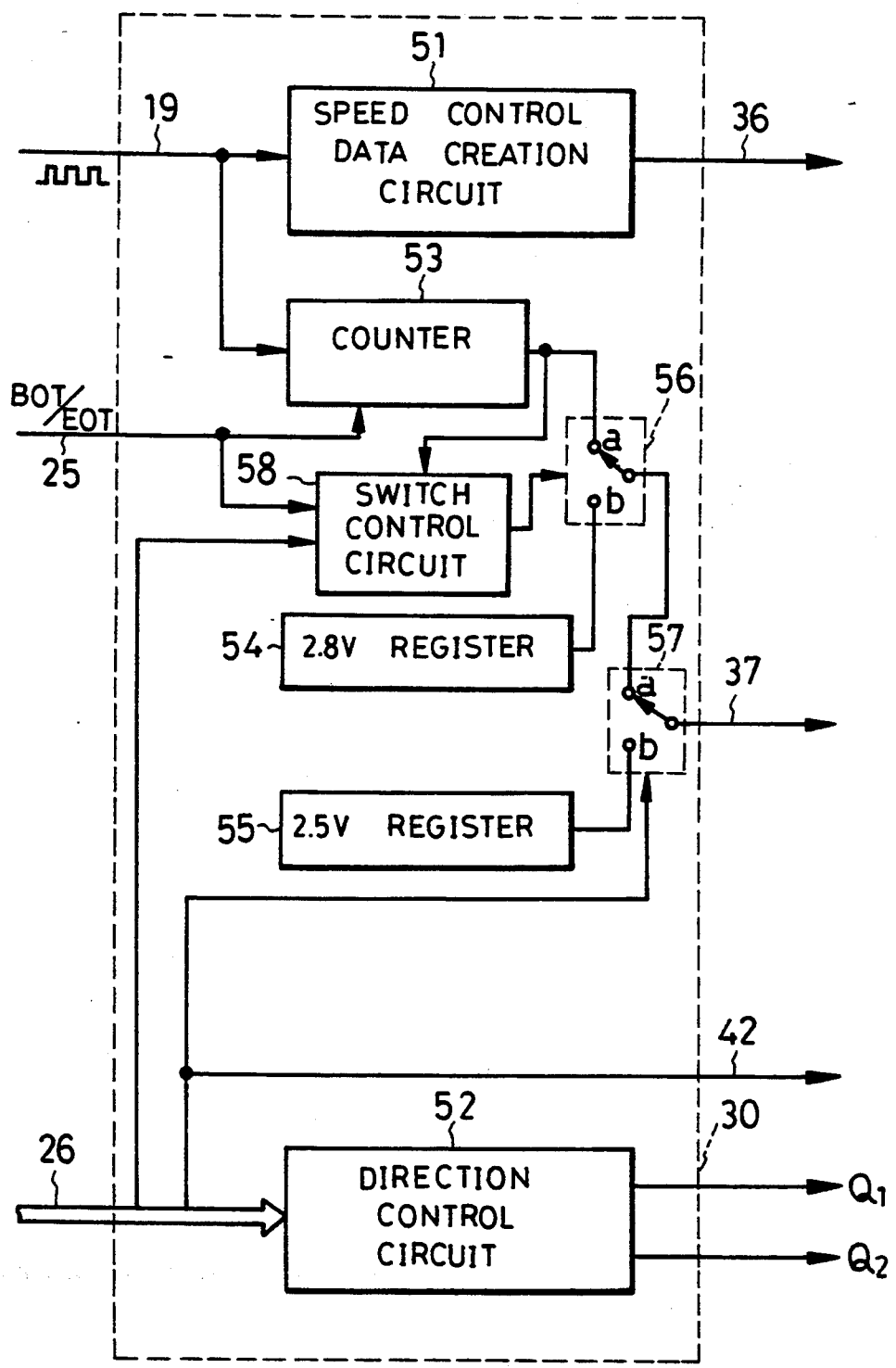
FIG. 3 is a functional block diagram of the controller included in the FIG. 2 motor control circuit.

Typically, the controller 30 takes the form of a microprocessor comprising a central processor unit and both random-access- and read-only-memories. Functionally speaking, however, the controller 30 may be thought of as being constructed as shown in FIG. 3. The controller 30 is herein shown to include a speed control data creation circuit 51 connected between the tape speed sensor 16, FIG. 1, and the duration modulated pulse generator 31, FIG. 2.

During writing or reading of data on the tape 5 by the head 11, the speed control data creation circuit 51 constantly inputs the tape speed pulses from the tape speed sensor 16 over the line 19, determines the actual traveling speed of the tape from the recurrence rate of the incoming pulses, and creates speed control data necessary for feedback control of tape transportation at a desired constant speed. The speed control data is supplied over a line 36 to the duration modulated pulse generator 31, which then responds by generating a series of speed control pulses having their durations modulated accordingly. These pulses have a fixed cycle of, typically, sixty-four microseconds but are subject to change in duty ratio. The voltage converter 32, FIG. 2, translates the incoming duration modulated speed control pulses into a unidirectional voltage with a magnitude determined by the pulse durations. Inputting this voltage, the driver circuit 33 causes conduction through the speed control transistor 27 to a corresponding degree, with the consequent application of the supply voltage of controlled magnitude to either of the reel motors 13 and 14.

With reference back to FIG. 3 the controller 30 is also shown to include a direction control circuit 52 for directional control of tape transportation. Inputting the various tape run commands from the unshown host system over the bus 26, the direction control circuit 52 puts out the signals for direct on/off control of the direction control transistors $Q_1$ and $Q_2$, as has been set forth previously.

For tape tension control the controller 30 is shown to comprise a bidirectional counter 53, two registers 54 and 55, two selector switches 56 and 57, and a switch control circuit 58. The controller 30 determines tape tension control data when the tape is at rest, on the bases of the diameters of tape rolls on the reels 3 and 4, FIG. 1, of the tape cassette 1 according to this invention. Toward this end the bidirectional counter 53 is shown to have inputs connected to the tape speed sensor 16 by way of the line 19, and to the BOT/EOT sensor 22 by way of the line 25. Reset each time the sensor 22 senses the BOT and EOT markers, the counter 53 counts the tape speed pulses in an increasing direction during forward tape travel and in a decreasing direction during reverse tape travel. The tension control data is sent to the DAC 34, FIG. 2, via the switches 56 and 57 and the line 37.

The first selector switch 56 chooses between the tension control data from the counter 53 and the output from the first register 54 under the control of the switch control circuit 58, for delivery to the DAC 34. The first register 54 has stored therein digital data representative of a relatively high voltage of, say, 2.8 volts. Relying on the outputs from the BOT/EOT sensor 22, the tension control data from the counter 54, and the tape run commands over the bus 26, the switch control circuit 58 ascertains whether the current tape position is known or not and causes the first selector switch 56 to choose the 2.8 volt register 54 when the current tape position is unknown. The DAC 34 on inputting the digital 2.8 volts data will put out a voltage of the same magnitude.

The second register 55, on the other hand, stores digital data representative of a lower voltage of, say, 2.5 volts. The second selector switch 57 will cause this 2.5 volt data to be delivered to the DAC 34 over the line 37 during tape travel, either forward or reverse, instead of the output from the first selector switch 56. The DAC 34 on inputting the 2.5 volts data will put out a voltage of that magnitude.

As will be understood by referring to FIG. 2 again, the DAC 34 delivers an analog equivalents of the various digital tension control data from the controller 37 to the tension control circuit 35 over a line 38. The tension control circuit 35 generates tension control signals in the form of variable voltage signals from the tension control data as well as from a motor current signal supplied thereto over a line 39 connected to one extremity of the feedback resistor $R_3$. The tension control signals are sent over lines 40 and 41 to the bases of the tension control transistors $Q_3$ and $Q_4$. The emitters of these tension control transistors are coupled to the tension control circuit 35 by way of respective lines 46 and 47 for feedback purposes.

Seen at 43 in FIG. 2 is a motor braking circuit. It comprises a resistor 96 connected in parallel with the reel motors 13 and 14 via respective diodes 44 and 45.

Figure 4:
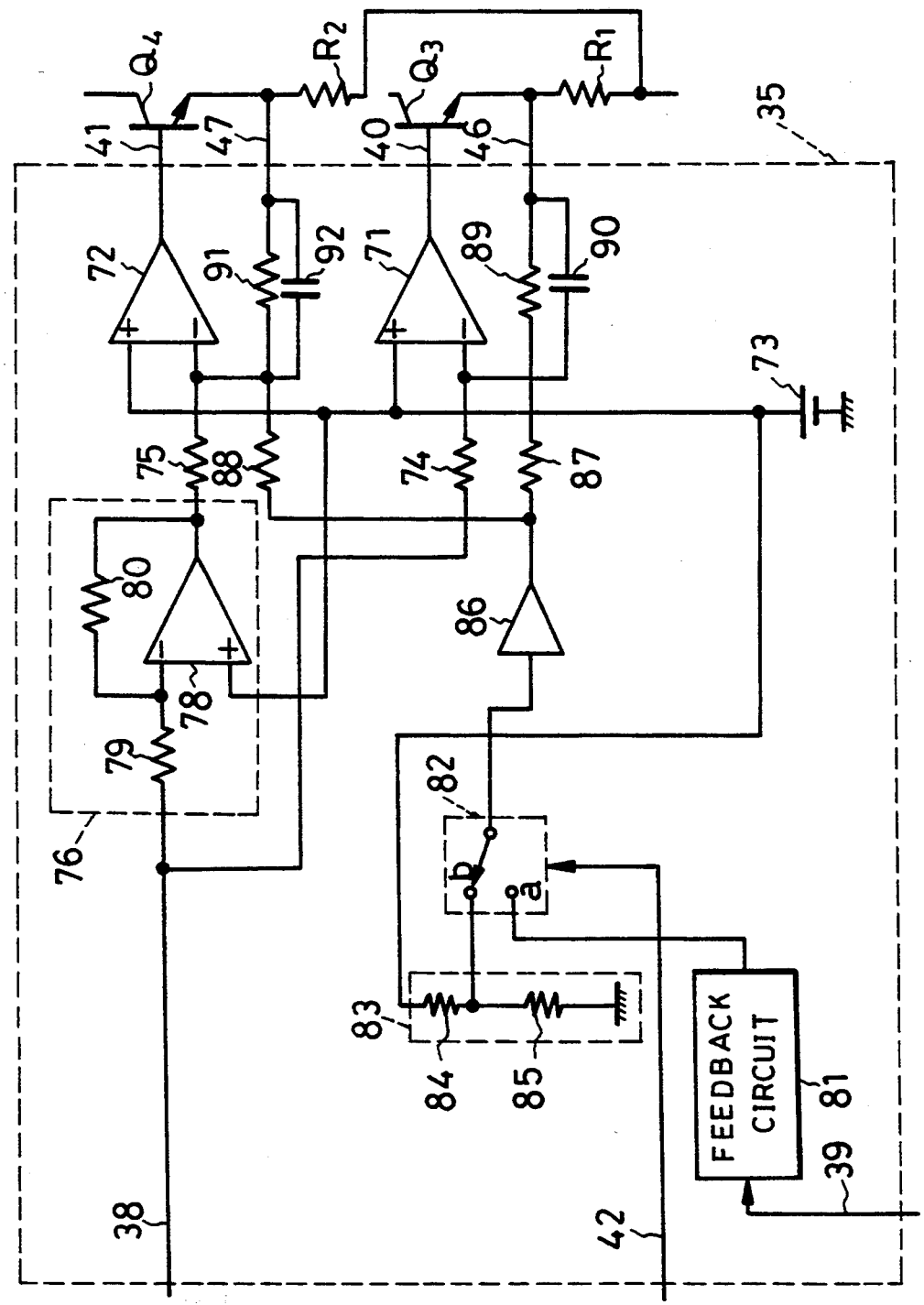
FIG. 4 is a schematic electrical diagram showing in detail the tension control circuit included in the FIG. 2 motor control circuit.

As illustrated in detail in FIG. 4, the tension control circuit 35 comprises a first 71 and a second 72 operational amplifier. Both operational amplifiers have their noninverting inputs connected to a reference voltage source 73, and their outputs to the bases of the tension control transistors $Q_3$ and $Q_4$ by way of the lines 40 and 41, respectively. The inverting input of the first operational amplifier 71 is connected to the DAC output line 38 via a resistor 74, and the inverting input of the second operational amplifier 72 to the DAC output line 38 via another resistor 75 and an inverting amplifier 76. This inverting amplifier 76 comprises an operational amplifier 78 and two resistors 79 and 80. The resistor 79 is connected between the DAC output line 38 and the inverting input of the operational amplifier 78 whereas the other resistor 80 is connected between the inverting input and output of the operational amplifier 78. The noninverting input of the operational amplifier 78 is connected to the reference voltage source 73.

Also included in the tension control circuit 35 is a feedback circuit 81 having its input connected to the feedback line 39, FIG. 2, and its output to the fixed contact a of a selector switch 82. Comprising an amplifier and resistors, the feedback circuit 81 puts out a signal indicative of the variable magnitude of the current flowing through either of the reel motors 13 and 14, the output signal being utilized for feedback control of tape tension during tape transportation.

The selector switch 82 has another fixed contact b to which is connected a bias source 83. This bias source puts out a bias voltage obtained by dividing the reference voltage from the source 73 by two resistors 84 and 85, such a bias voltage being utilized according to the invention for tape tension control when the tape is at rest.

The selector switch 82 selects either of its contacts a and b in response to a signal indicative of whether the tape is traveling or at a standstill, such a signal being supplied over a line 42, FIG. 3, branching off from the tape run commands bus 26. The contact a is chosen when the tape is running, and the contact b when it is at rest. It will be noted from FIG. 2 that the signal line 42 is also connected to the transistor driver circuit 33 for purposes yet to be described.

The output of the selector switch 82 is connected to a buffer amplifier 86 and thence to the inverting input of the first operational amplifier 71 via a resistor 87 and to the inverting input of the second operational amplifier 72 via a resistor 88.

The emitter of the first tension control transistor $Q_3$ is connected to the inverting input of the first operational amplifier 71 via a parallel connection of resistor 89 and capacitor 90 to form a feedback circuit. The emitter of the second tension control transistor $Q_4$ is likewise connected to the inverting input of the second operational amplifier 72 via a parallel connection of resistor 91 and capacitor 92 to form a feedback circuit.

The typical constants of the various pertinent parts of the FIG. 4 circuitry are as follows:

| Reference voltage source 73 | 2.5 volts |
|---|---|
| Resistors 74 and 75 | 30 kilohms |
| Resistors 79, 80 and 84 | 12 kilohms |
| Resistor 85 | 43 kilohms |
| Resistor 87 | 10 kilohms |
| Resistor 88 | 6.2 kilohms |
| Resistors 89 and 91 | 12 kilohms |
| Capacitors 90 and 92 | 0.01 microfarads |
| Resistor $R_1$ | 12 ohms |
| Resistor $R_2$ | 15 ohms |
| Supply voltage of amplifiers 71, 72, 78 and 86 | 12 volts. |

Operation

Assume that the controller 30, FIGS. 2 and 3, has now received from the host a forward tape run command dictating the forwarding of the tape 5 for writing or reading. Then the direction control circuit 52 of the controller 30 will respond by turning the first direction control transistor $Q_1$ off, and the second direction control transistor $Q_2$ on. Then the takeup reel motor 14 will start rotation, being energized through the closed supply circuit comprising the supply terminal 28, speed control transistor 27, motor 14, second direction control transistor $Q_2$, feedback resistor $R_3$ and grounding terminal 29.

As the tape 5 thus starts traveling forwardly, the speed sensor 16, FIG. 1, will begin delivering tape speed pulses to the controller 30 over the line 19. The speed control data creation circuit 51 of the controller 30 will then respond by creating speed control data accordingly, for delivery to the duration modulated pulse generator 31, FIG. 2. The duration modulated speed control pulses from the generator 31 will be translated by the voltage converter 32 into an equivalent unidirectional voltage for controlling the collector-emitter resistance of the speed control transistor 27. There will thus be completed a tape speed control servo loop whereby the supply voltage across the takeup reel motor 14 will be controlled so as to hold constant the traveling speed of the tape.

Figure 5:
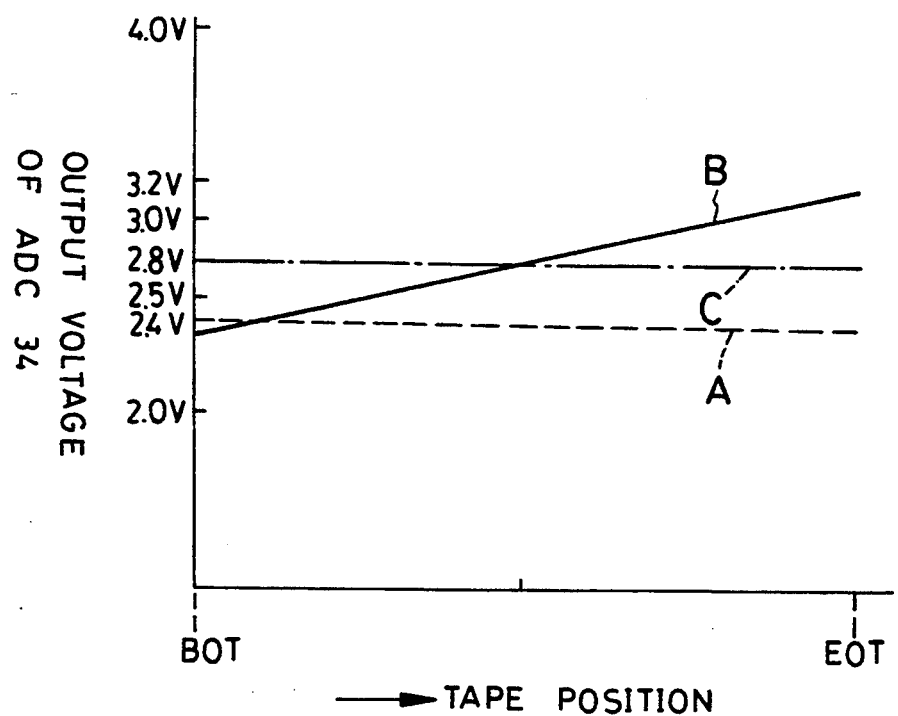
FIG. 5 is a graphic representation of the output voltages of the digital to analog converter, included in the FIG. 2 motor control circuit, against tape position when the tape is traveling, stopped, and when the tape position is unknown.

Tape tension during such forward tape travel is controlled by energizing the file reel motor 13 in a direction opposite to the rotational direction of the takeup reel motor 14. The supply voltage across the file reel motor 13 must be varied according to the varying diameters of the tape rolls on both reels. The tension control circuit 35 makes such control of the supply voltage in cooperation with the controller 30 in the following manner:

As has been set forth with reference to FIG. 3, the functional diagram of the controller 30, the selector switch 57 connects the 2.5 volts register 55 to the output line 37 during forward, as well as reverse, tape travel. Thus the DAC 34, FIG. 2, supplies a voltage of 2.5 volts to the tension control circuit 35 over the line 38. This output voltage of the DAC 34 remains unchanged throughout tape travel from BOT to EOT, and vice versa, as indicated by the dashed line designated A in FIG. 5.

In the tension control circuit 35, FIG. 4, the switch 82 connects the feedback circuit 81 to the inverting inputs of both operational amplifiers 71 and 72. Since the voltage on the DAC output line 38 is constant at 2.5 volts as aforesaid, the output from the first operational amplifier 71 changes with the voltage from the feedback circuit 81 during forward tape travel. The voltage from the feedback circuit 81 gradually increases with the progress of forward tape travel, so that the output from the first operational amplifier 71 gradually decreases, resulting in turn in a gradual increase in the collector-to-emitter voltage of the first tension control transistor $Q_3$ and, therefore, in a gradual decrease in the voltage across the file reel motor 13. This gradual decrease in the voltage across the file reel motor is essential for constant tape tension during forward tape travel, because then the tape roll on the file reel 3 of the tape cassette 1, FIG. 1, decreases in diameter and hence in weight, imposing a progressively less load on the file reel motor 13.

The second tension control transistor $Q_4$ as well as the resistor $Q_2$ is short circuited during forward tape travel by the second direction control transistor $Q_2$, which is then conductive as aforesaid. The second tension control transistor is therefore independent of the output from the second operational amplifier 72 of the tension control circuit 35.

During reverse tape travel, on the other hand, the file reel motor switching transistor $Q_1$ is on, and the takeup reel motor switching transistor $Q_2$ off. As during forward tape travel the selector switch 57, FIG. 3, of the controller 30 connects the 2.5 volts register 55 to the output line 37, so that the DAC 34, FIG. 2, supplies a constant voltage of 2.5 volts to the tension control circuit 35.

In the tension control circuit 35, FIG. 4, the 2.5 volts output from the DAC 34 is impressed to the inverting input of the inverting amplifier 76, to the noninverting input of which is applied the 2.5 volts output is from the reference voltage source 73. The resulting 2.5 volts output from the inverting amplifier 76 is impressed to the inverting input of the second operational amplifier 72. Thus, as during forward tape travel, the output from the second operational amplifier 72 changes with the voltage from the feedback circuit 81, which is held connected to the inverting inputs of both operational amplifiers 71 and 72 by the switch 82. It is therefore apparent that the second operational amplifier 72 functions to cause a gradual increase in the collector-to-emitter voltage of the second tension control transistor $Q_4$ and hence a gradual decrease in the voltage across the takeup reel motor 14, thereby holding the tape under constant tension during reverse tape travel.

For holding the tape under tension when it is at rest according to the invention, the driver circuit 33, FIG. 2, applies a constant voltage to the speed control transistor 27 in response to the signal on the line 42 indicative of whether the tape is traveling or not. Consequently, both reel motors 13 and 14 can be energized from the supply terminal 28 even when the tape is at rest.

In the controller 30, FIG. 3, the second selector switch 57 also responds to the signal on the line 42 by connecting the first selector switch 56 to the output line 37. It is understood that the current tape position is now known, so that it is the bidirectional counter 53, rather than the 2.8 volts register 54, that is thus connected to the controller output line 37. As is conventional in the art, the bidirectional counter 53 is reset when the BOT/EOT sensor 22, FIG. 1, senses the BOT or EOT marker during the initialization process following the loading of the tape cassette 1 in the tape transport, and thereafter continuously puts out a count corresponding to the current tape position. When the tape is stopped in any arbitrary position, therefore, the output from the counter 53 indicates that tape position.

Inputting this output from the counter 53 over the line 37, the DAC 34, FIG. 2, produces a voltage signal having a magnitude corresponding to the count of the counter and hence to the current tape position. Thus, as graphically indicated at B in FIG. 5, the output voltage of the DAC 34 increases linearly from, say, 2.4 volts at BOT to, say, 3.2 volts at EOT. This variable voltage signal is applied to the tension control circuit 35 over the line 38 for controlling tape tension when the tape is at rest.

The selector switch 82, FIG. 4, of the tension control circuit 35 also responds to the signal on the line 42 by connecting the bias voltage source 83 to the buffer amplifier 86 when the tape is stopped. The tension control feedback loop is now opened; instead, a constant bias voltage is applied to the inverting inputs of both operational amplifiers 71 and 72.

Figure 6:
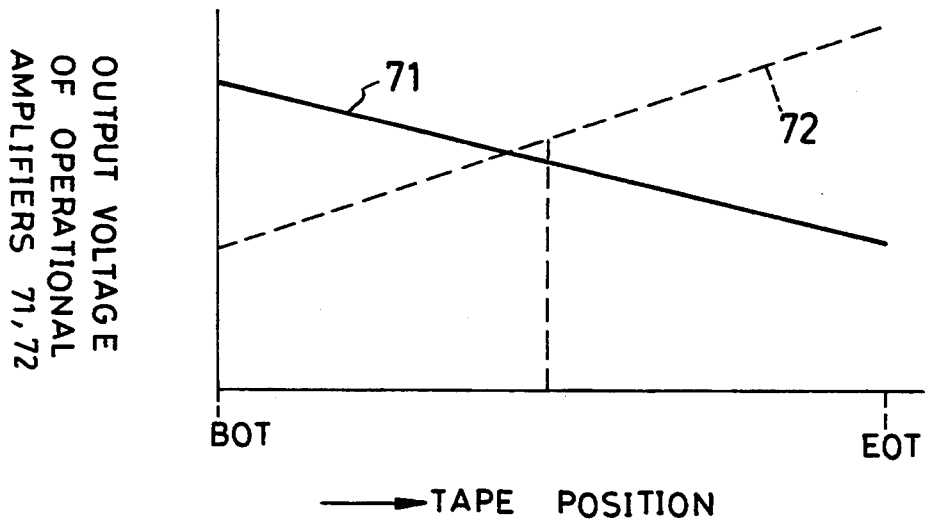
FIG. 6 is a graphic representation of the output voltages of the two operational amplifiers, included in the FIG. 4 tension control circuit, against tape position when the tape is stopped.

FIG. 6 graphically represents the voltages produced by the two operational amplifiers 71 and 72 in response to the variable voltage signal from the DAC 34 and the constant bias voltage from the source 83, against tape position from BOT to EOT. It will be noted that the output voltage of the first operational amplifier 71 decreases linearly from BOT to EOT because of the prepositioned inverting amplifier 76, whereas that of the second operational amplifier 72 increases linearly from BOT to EOT.

Let it be assumed that the tape has been stopped at BOT. The output voltage of the DAC 34 is the lowest when the tape is in this tape position, according to the voltage gradient B in FIG. 5. The output voltage of the first operational amplifier 71 is therefore the highest now, as will be seen from the graph of FIG. 6, and gradually decreases toward EOT. Thus, as the output voltage of the first operational amplifier gradually decreases from BOT to EOT, so does the voltage with which the file reel motor 13 is energized. The file reel motor is thus energized with a decreasing voltage from BOT to EOT because the diameter, and hence the weight, of the tape roll on the file reel 3 decreases in that direction.

The output voltage of the DAC 34 when the tape is at rest is directed through the inverting amplifier 76 to the second operational amplifier 72, so that the output voltage of the second operational amplifier is the lowest when the tape is stopped at BOT, and linearly increases toward EOT. Thus, as indicated by the dashed line in FIG. 6, the output voltage of the second operational amplifier 72 has a gradient opposite in direction to that of the output voltage of the first operational amplifier 71. The takeup reel motor 14 is therefore energized with an increasing voltage from BOT to EOT because the tape roll diameter on the takeup reel 4 increases in that direction.

It will thus be appreciated that, whatever position the tape may be stopped in, it can be held under proper tension as both reel motors 13 and 14 are energized with voltages determined by the variable voltage output from the DAC 34 and hence by that tape position. The tape position is accurately ascertained by bidirectionally counting the output pulses of the tape speed sensor 16 from either extremity of the tape, which sensor is a standard component of tape transports of the kind under consideration. Further, the variable voltage corresponding to the variable tape position is obtained merely by directing the count of the bidirectional counter 53 into the DAC 34. Thus the tape transports of standard design require only minor alterations in electronics for incorporating the teachings of this invention.

The tape position is unknown from the loading of the tape cassette 1 to the detection of the BOT or EOT marker by the sensor 22. During such times, as well as when the tape position subsequently becomes unknown for some reason or other, the switch control circuit 58 of the FIG. 3 controller 30 will cause the selector switch 56 to choose the 2.8 volts register 54. Then the DAC 34, FIG. 2, will put out a constant voltage of 2.8 volts, as indicated C in FIG. 5, until the current tape position becomes known.

Despite the foregoing detailed disclosure, it is not desired that the invention be limited by the exact showing of the drawings of the description thereof. The following, then, is a brief list of possible modifications, alterations and adaptations of this invention which are all believed to fall within the scope of the invention:

1. The output voltage from the DAC 34 could be increased from BOT to EOT during tape travel, too, instead of being held constant as in FIG. 5, for tape tension control when the tape was traveling. In this case, however, the increase in DAC output voltage might be made a little steeper than that when the tape was at rest.
2. The feedback resistor $R_3$, FIG. 2, could be omitted if the motor current signal, needed for feedback control of tape tension during tape travel, was obtained from the supply side of the reel motors 13 and 14.
3. The tape speed sensor 16, FIG. 1, might be replaced by a revolution sensor or sensors of either or both of tape cassette reel hubs, although in this case the resulting reel revolution data would have to be amended according to the amount of travel of the tape for providing the desired tape speed data.

What is claimed is:

1. A tape tension control system for a tape transport for use with a tape assembly of the kind having a length of tape extending between a pair of reels within a housing, comprising:
   (a) power supply means;
   (b) a pair of reel motors connected to the power supply means for bidirectionally driving the tape between the pair of reels of the tape assembly;
   (c) a pair of tension control elements connected one between each reel motor and the power supply means for holding the tape under tension, each tension control element being capable of controllably varying a voltage applied from the power supply means to one of the reel motors in response to a variable voltage signal;
   (d) a transducer for data transfer with the tape of the tape assembly;
   (e) tape position sensor means for ascertaining a current position of the tape with respect to the transducer; and (f) tension control means connected between the tape position sensor means and the pair of tension control elements for applying to the tension control elements the variable voltage signals having magnitudes determined by the tape position when the tape is stopped, the variable voltage signals being such that the voltage applied to one of the reel motors decreases linearly, and the voltage applied to the other of the reel motors increases linearly, as the tape travels from a first toward a second extremity thereof, and vice versa.

2. The tape tension control system of claim 1 wherein the tape position sensor means comprises:
  (a) a tape speed sensor for providing a series of tape speed pulses indicative of the traveling speed of the tape; and
  (b) a bidirectional counter connected to the tape speed sensor for bidirectionally counting the tape speed pulses from either extremity of the tape toward the other in order to provide a count indicative of the current position of the tape with respect to the transducer.

3. The tape tension control system of claim 2 wherein the tension control means comprises a digital to analog converter connected to the bidirectional counter for translating the count of the counter into an equivalent voltage, the voltage output of the converter varying with a predetermined gradient as the tape travels from one extremity thereof toward the other.

4. The tape tension control system of claim 3 wherein the tension control means further comprises:
  (a) first circuit means connected between the digital to analog converter and a first of the tension control elements for applying to the first tension control elements one of the variable voltage signals having a gradient equal in direction to the gradient of the voltage output of the converter; and
  (b) second circuit means connected between the digital to analog converter and a second of the tension control elements for applying to the second tension control elements the other of the variable voltage signals having a gradient opposite in direction to the gradient of the voltage output of the converter.

5. A tape tension control system for a tape transport for use with a tape assembly of the kind having a length of tape extending between a pair of reels within a housing, comprising:
  (a) power supply means;
  (b) a pair of reel motors connected to the power supply means for bidirectionally driving the tape between the pair of reels of the tape assembly;
  (c) a pair of tension control elements connected one between each reel motor and the power supply means for holding the tape under tension, each tension control element being capable of controllably varying a voltage applied from the power supply means to one of the reel motors in response to a variable voltage signal;
  (d) a transducer for data transfer with the tape of the tape assembly;
  (e) a tape speed sensor for providing a series of tape speed pulses indicative of the traveling speed of the tape;
  (f) a bidirectional counter connected to the tape speed sensor for bidirectionally counting the tape speed pulses from either extremity of the tape toward the other in order to provide a count indicative of a current position of the tape with respect to the transducer;
  (g) a source of digital data representative of a constant voltage;
  (h) a selector switch;
  (i) a digital to analog converter to be connected, when the tape is traveling, to the source of digital data by the selector switch for translating the digital data into the constant voltage and, when the tape is stopped, to the bidirectional counter for translating the count of the counter into an equivalent variable voltage, the variable voltage output from the converter having a magnitude depending upon the position in which the tape is stopped;
  (j) a feedback circuit for providing a feedback signal representative of a current flowing through either of the reel motors; and
  (k) a tension control circuit connected to all of the tension control elements and the converter and the feedback circuit for holding the tape under constant tension, when the tape is traveling in either direction, by applying to one of the tension control elements the variable voltage having a magnitude depending upon the feedback signal and, when the tape is stopped, for holding the tape under tension by applying to both of the tension control elements the variable voltage signals having magnitudes depending upon the variable voltage output from the converter.

6. The tape tension control system of claim 5 wherein the tension control circuit comprises:
  (a) a source of a reference voltage;
  (b) a first operational amplifier having a first input connected to the reference voltage source, a second input connected to the digital to analog converter and to the feedback circuit, and an output connected to one of the pair of tension control elements;
  (c) an inverting amplifier having a first input connected to the reference voltage source, and a second input connected to the digital to analog converter;
  (d) a second operational amplifier having a first input connected to the reference voltage source, a second input connected to an output of the inverting amplifier and to the feedback circuit, and an output connected to the other of the tension control elements.

7. The tape tension control system of claim 6 wherein the tension control circuit further comprises:
  (a) a bias source for providing a bias voltage; and
  (b) a second selector switch for connecting the feedback circuit to the second inputs of the first and the second operational amplifiers when the tape is traveling, and the bias source to the second inputs of the first and the second operational amplifiers when the tape is stopped.

8. The tape tension control system of claim 7 wherein the bias source is a voltage dividing circuit connected to the reference voltage source.

* * * * *